US007783784B1

(12) United States Patent
Droux et al.

(10) Patent No.: US 7,783,784 B1
(45) Date of Patent: Aug. 24, 2010

(54) METHOD AND APPARATUS FOR ADAPTIVE SELECTION OF ALGORITHMS TO LOAD AND SPREAD TRAFFIC ON AN AGGREGATION OF NETWORK INTERFACE CARDS

(75) Inventors: Nicolas G. Droux, San Jose, CA (US); Sunay Tripathi, San Jose, CA (US); Paul Durrant, Slough (GB)

(73) Assignee: Oracle America, Inc., Redwood City, CA (US)

( * ) Notice: Subject to any disclaimer, the term of this patent is extended or adjusted under 35 U.S.C. 154(b) by 1451 days.

(21) Appl. No.: 10/931,146

(22) Filed: Aug. 31, 2004

(51) Int. Cl.
*G06F 15/16* (2006.01)
*G06F 15/177* (2006.01)
*H04L 12/50* (2006.01)

(52) U.S. Cl. .................. 709/250; 709/223; 709/224; 709/225; 370/358; 370/359

(58) Field of Classification Search .............. 709/223, 709/224, 225, 250
See application file for complete search history.

(56) References Cited

U.S. PATENT DOCUMENTS

| 6,501,749 | B1 * | 12/2002 | Alexander et al. | 370/351 |
|---|---|---|---|---|
| 6,591,303 | B1 * | 7/2003 | Hendel et al. | 709/238 |
| 6,687,758 | B2 * | 2/2004 | Craft et al. | 709/250 |
| 6,874,147 | B1 * | 3/2005 | Diamant | 719/328 |
| 7,469,295 | B1 * | 12/2008 | Gangadharan | 709/232 |
| 7,478,173 | B1 * | 1/2009 | Delco | 709/250 |
| 2001/0012778 | A1 * | 8/2001 | Eriksson et al. | 455/436 |
| 2002/0107962 | A1 * | 8/2002 | Richter et al. | 709/225 |
| 2003/0023669 | A1 * | 1/2003 | DeLima et al. | 709/203 |
| 2003/0140124 | A1 * | 7/2003 | Burns | 709/220 |
| 2003/0204619 | A1 * | 10/2003 | Bays | 709/238 |
| 2004/0205761 | A1 * | 10/2004 | Partanen | 718/105 |
| 2005/0149940 | A1 * | 7/2005 | Calinescu et al. | 718/104 |
| 2005/0221839 | A1 * | 10/2005 | Chan et al. | 455/453 |
| 2006/0031506 | A1 * | 2/2006 | Redgate | 709/226 |
| 2006/0034310 | A1 * | 2/2006 | Connor | 370/419 |
| 2006/0039276 | A1 * | 2/2006 | Jain et al. | 370/218 |
| 2007/0162629 | A1 * | 7/2007 | Sauermann | 710/11 |
| 2009/0172301 | A1 * | 7/2009 | Ebersole et al. | 711/154 |

* cited by examiner

*Primary Examiner*—Dohm Chankong
*Assistant Examiner*—Hieu Hoang
(74) *Attorney, Agent, or Firm*—Osha • Liang LLP

(57) ABSTRACT

A method for configuring a link aggregation module, including configuring the link aggregation module to use an initial network interface card (NIC) selection algorithm, servicing a first plurality of packets using a plurality of NICs in an aggregation group, wherein the initial NIC selection algorithm is used to select the one of the plurality of NICs to service at least one of the first plurality of packets, collecting a plurality of first packet distribution statistics for the aggregation group corresponding to the servicing of the first plurality of packets, and selecting a first alternate NIC selection algorithm based on the plurality of first packet distribution statistics.

21 Claims, 3 Drawing Sheets

METHOD AND APPARATUS FOR ADAPTIVE SELECTION OF ALGORITHMS TO LOAD AND SPREAD TRAFFIC ON AN AGGREGATION OF NETWORK INTERFACE CARDS

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet of data. The payload contains the actual data to be transmitted from the network to the receiving system.

Some sending and receiving systems include a single NIC while other sending and receiving systems include multiple NICs. When multiple NIC are present on the system, one or more NICs may be grouped to form an aggregation group. The sending and receiving systems that include aggregations groups typically have higher packet throughput due to the higher availability of NICs through which packets may be sent and received. More specifically, the aggregation group is utilized by the systems (i.e., sending and receiving systems) via a virtual NIC.

Thus, when a client (i.e., a process configured to send and/or receive a packet) attempts to send a packet to a receiving system, the client sends the packet to the virtual NIC (which appears to the client as an actual NIC). A link aggregation module within the system receives the packet and then determines which of the multiple NICs within the aggregation group to use to service the packet (i.e., send the packet to receiving system). The link aggregation module subsequently forwards the request to the appropriate NIC in the aggregation group. The NIC subsequently services the packet.

As noted above, the link aggregation module includes functionality to select which NIC within the aggregation group to service the request. More specifically, the link aggregation module includes one or more NIC selection algorithms which may be used to select the NIC within the aggregation group that should service a particular packet. The NIC selection algorithm used by the link aggregation module is typically selected by a system administrator when the link aggregation module is configured. The system administrator typically selects the NIC selection algorithm using knowledge about the network topology and applications executing on the system in which the link aggregation module is deployed.

SUMMARY

In general, in one aspect, the invention relates to a method for configuring a link aggregation module, comprising configuring the link aggregation module to use an initial network interface card (NIC) selection algorithm, servicing a first plurality of packets using a plurality of NICs in an aggregation group, wherein the initial NIC selection algorithm is used to select the one of the plurality of NICs to service at least one of the first plurality of packets, collecting a plurality of first packet distribution statistics for the aggregation group corresponding to the servicing of the first plurality of packets, and selecting a first alternate NIC selection algorithm based on the plurality of first packet distribution statistics.

In general, in one aspect, the invention relates to a system, comprising a client configured to send a plurality of packets, an aggregation group comprising a plurality of network interface cards (NICs), and a link aggregation module initially configured to service a plurality of packets using a plurality of NICs in an aggregation group, wherein the initial NIC selection algorithm is used to select the one of the plurality of NICs to service at least one of the plurality of packets, collect a plurality of packet distribution statistics for the aggregation group corresponding to the servicing of the plurality of packets, and select a first alternate NIC selection algorithm based on the plurality of packet distribution statistics.

In general, in one aspect, the invention relates to a computer system for configuring a link aggregation module, comprising a processor, a memory, a storage device, and software instructions stored in the memory for enabling the computer system under control of the processor, to configure the link aggregation module to use an initial network interface card (NIC) selection algorithm, service a plurality of packets using a plurality of NICs in an aggregation group, wherein the initial NIC selection algorithm is used to select the one of the plurality of NICs to service at least one of the plurality of packets, collect a plurality of packet distribution statistics for the aggregation group corresponding to the servicing of the plurality of packets, and select a first alternate NIC selection algorithm based on the plurality of packet distribution statistics.

In general, in one aspect, the invention relates to a computer readable medium for configuring a link aggregation module, comprising software instructions to configure the link aggregation module to use an initial network interface card (NIC) selection algorithm, service a plurality of packets using a plurality of NICs in an aggregation group, wherein the initial NIC selection algorithm is used to select the one of the plurality of NICs to service at least one of the plurality of packets, collect a plurality of packet distribution statistics for the aggregation group corresponding to the servicing of the plurality of packets, and select a first alternate NIC selection algorithm based on the plurality of packet distribution statistics.

In general, in one aspect, the invention relates to a plurality of nodes, comprising a client configured to send a plurality of packets, a aggregation group comprising a plurality of network interface cards (NICs), and a link aggregation module initially configured to service a first plurality of packets using a plurality of NICs in an aggregation group, wherein the initial NIC selection algorithm is used to select the one of the plurality of NICs to service at least one of the plurality of packets, collect a plurality of packet distribution statistics for the aggregation group corresponding to the servicing of the plurality of packets, and select a first alternate NIC selection algorithm based on the plurality of packet distribution statistics, wherein the client is located on at least one of the plurality of nodes, wherein the aggregation group is located on at least one of the plurality of nodes, wherein the link aggregation module is located on at least one of the plurality of nodes.

Other aspects of the invention will be apparent from the following description and the appended claims.

DETAILED DESCRIPTION

Figure 1:
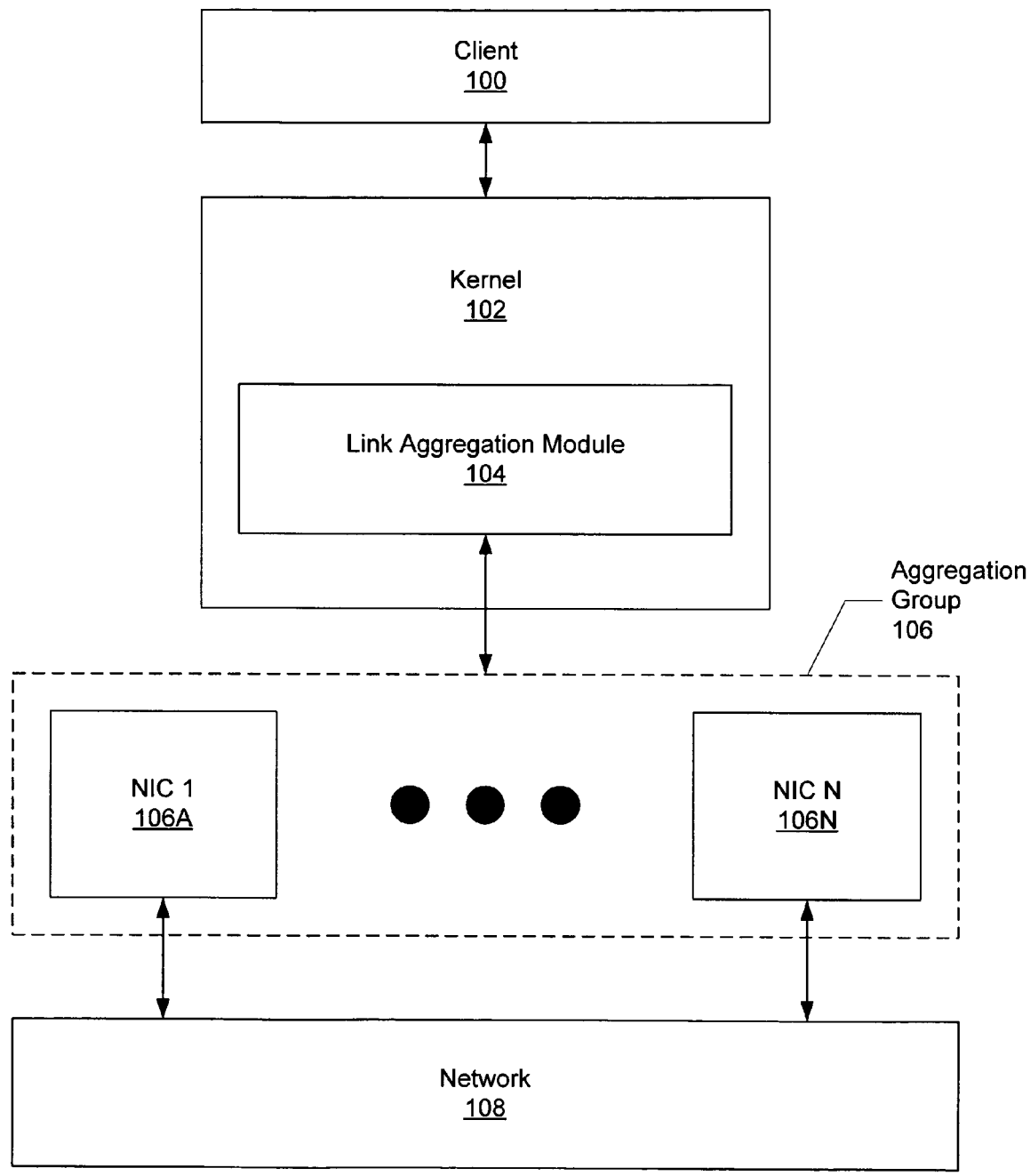
FIG. 1 shows a system in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

In general, embodiments of the invention provide a method and system for selecting a NIC selection algorithm. Further, embodiments of the invention provide a method and system that includes functionality to change the NIC selection algorithm (i.e., self-tune) used by the link aggregation module to optimally distribute the load across the multiple NIC in the aggregation group. Further, embodiments of the invention provide a method and system using packet distribution statistics to aid in the selection of the optimal NIC selection algorithm for the particular link aggregation module.

FIG. 1 shows a system in accordance with one embodiment of the invention. The system includes a client (100) interfacing with a kernel (102). The client (100) corresponds to any process (or any system or device executing the process) that includes functionality to send and/or receive data. In one embodiment of the invention, the data is processed by the kernel (102) in a format necessary to transmit over a network (108). After processing, the packet is typically in a protocol compliant format (such as an Internet Protocol (IP) packet, etc.). The client (100) typically forwards the packet to the kernel (102). The kernel (102) includes the necessary functionality to receive the packet and forward the packet (via a link aggregation module (104)) to a corresponding aggregation group (106). The aggregation group (106) may include one or more NICs (e.g., NIC 1 (106A), NIC N (106N)).

In one embodiment of the invention, the client (100) and the kernel (102) are executing on a single server. Further, the server includes the necessary hardware to interface with the aggregation group (106). Alternatively, the kernel (102) may be executing on one system that includes the necessary hardware to interface with the aggregation group (106) and includes functionality to interface with multiple clients (100). In this scenario, the clients (100) may correspond to devices having a processor, a memory, and a communications interface (e.g., single NIC, serial cable, a universal serial bus (USB) cable, or any other mechanism for transmitting the packet to the kernel (102)).

In one embodiment of the invention, the link aggregation module (104) includes two or more NIC selection algorithms (i.e., algorithms used to determine which NIC (e.g., NIC 1 (106A), NIC N (106N)) within the aggregation group to use to service the packet. In one embodiment of the invention, the NIC selection algorithm uses the media access control (MAC) address of the destination system to determine the NIC (e.g., NIC 1 (106A), NIC N (106N)) to use to service the packet. The aforementioned NIC selection algorithm is typically used in network topologies where a server hosting the link aggregation group (106) is operatively connected to a switch (not shown) and is sending the packet to multiple receiving systems.

In one embodiment of the invention, the NIC selection algorithm uses protocol information within the packet to determine which NIC in the aggregation group to use for servicing the packet. The protocol information corresponds to information in one or more fields in the packet. The fields are governed by the protocol (i.e., IP, etc.) used to format the packet. If the packet is formatted using IP, the protocol information may correspond to a source port, a destination port, a source IP address, a destination IP address, etc. Further, combinations of protocol information may be used in selecting the NIC algorithm. The aforementioned NIC selection algorithm is typically used in network topologies where a server hosting the link aggregation group (106) is directly connected to another server (not shown) via the aggregation group. Those skilled in the art will appreciate that the invention is not limited to the two aforementioned NIC selection algorithms described above and that other NIC selection algorithms are possible.

In one embodiment of the invention, the link aggregation module (104) includes functionality to implement a given NIC selection algorithm to select the NIC (e.g., NIC 1 (106A), NIC N (106N)) in the aggregation group (106) to use for servicing the packet. Further, the link aggregation module (104) (or another process executing in the kernel (102)) includes functionality to obtain packet distribution statistics corresponding to the aggregation group (106). In one embodiment of the invention, the packet distribution statistics may include statistics that track utilization of system resources, utilization of network infrastructure resources, the number of packets serviced by each NIC in the aggregation group, the overall rate of servicing the plurality of packets, etc.

The link aggregation module (104) (or another process executing in the kernel (102)) further includes functionality to analyze the packet distribution statistics to determine whether the NIC selection algorithm currently implemented by the link aggregation module (104) is optimally distributing the load (i.e., the serving of packets) across the NICs in the aggregation group. In one embodiment of the invention, the link aggregation module (104) (or another process executing in the kernel (102)) compares the results of the analysis of the packet distribution statistics to a minimum threshold level. The minimum threshold level corresponds to minimal amount of load distribution required for load distribution to be considered optimally balanced. The minimum threshold level may be set to a default (or pre-determined) level set by the system administrator, etc.

Figure 2:
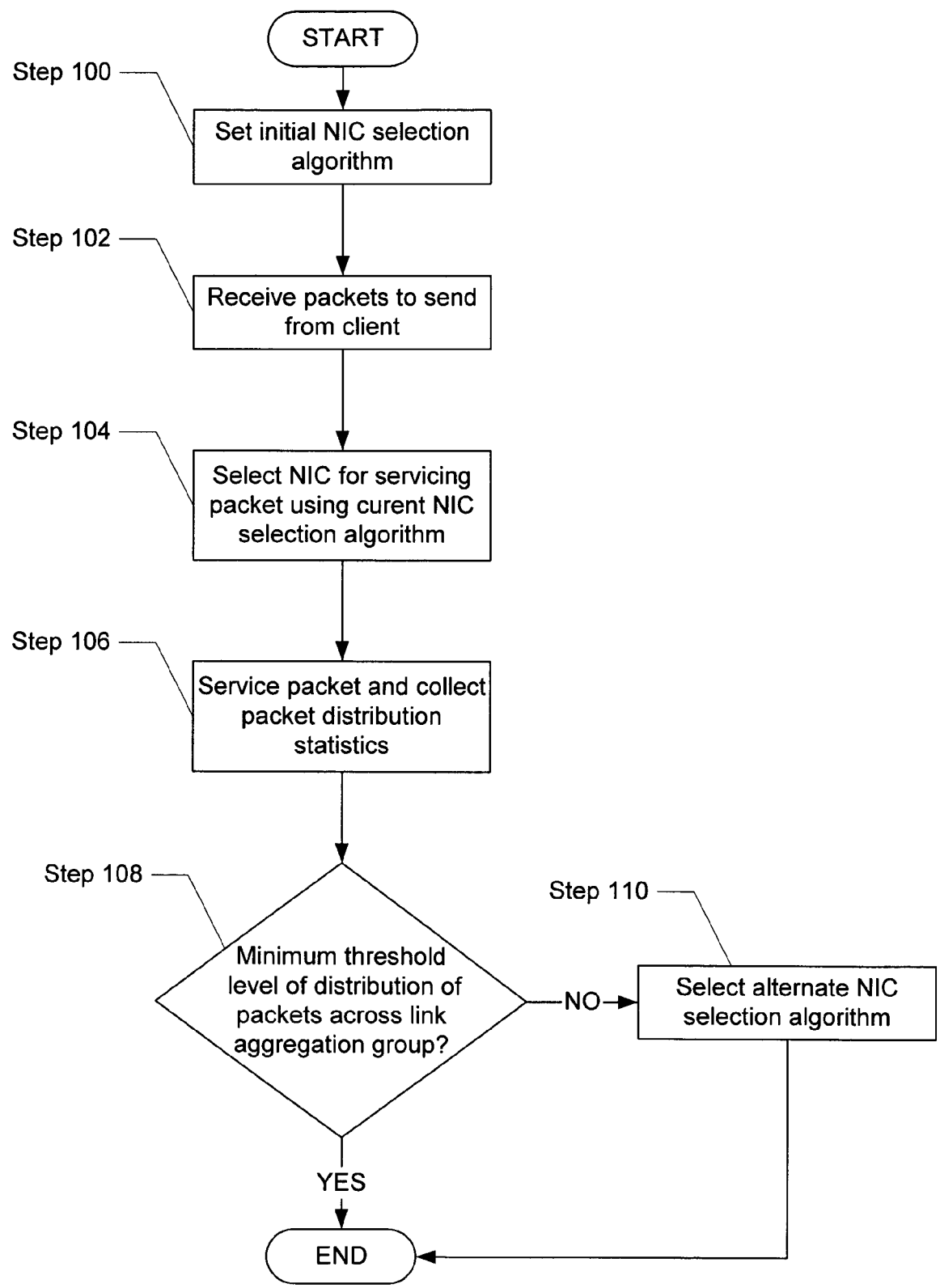
FIG. 2 shows a flow chart in accordance with one embodiment of the invention.

FIG. 2 shows a flow chart for in accordance with one embodiment of the invention. Initially the link aggregation module is configured to implement an initial NIC selection algorithm (ST100). In one embodiment of the invention, the NIC selection algorithm is selected using a selection method, such as default selection, random selection, and/or user selection. Once the link aggregation module is configured to implement the initial NIC selection algorithm, the system upon which the link aggregation module is executing begins to receive packets from one or more clients (ST102).

The link aggregation module subsequently receives the packets and determines the NICs within the aggregation group to use for servicing the request using the current NIC selection algorithm implemented by the link aggregation module (ST104). The packets are subsequently serviced and the corresponding packet distribution statistics are recorded (ST106). At certain time intervals, the packet distribution statistics collected in ST106 are analyzed and a determination is made whether the aggregation group is operating at or above the minimum threshold level (ST108). The time intervals may be selected by the system administrator or may be pre-determined or set as defaults within the link aggregation module.

If the aggregation group is operating at or above the minimum threshold level, then the link aggregation module may continue to use the current NIC aggregation module. Alternatively, if the aggregation group is operating below the minimum threshold level, then an alternate NIC aggregation algorithm may be selected and implemented by the link aggregation level (ST110). Step 102-Step 108 may then repeated until the aggregation group is operating at or above the minimum threshold level.

Figure 3:
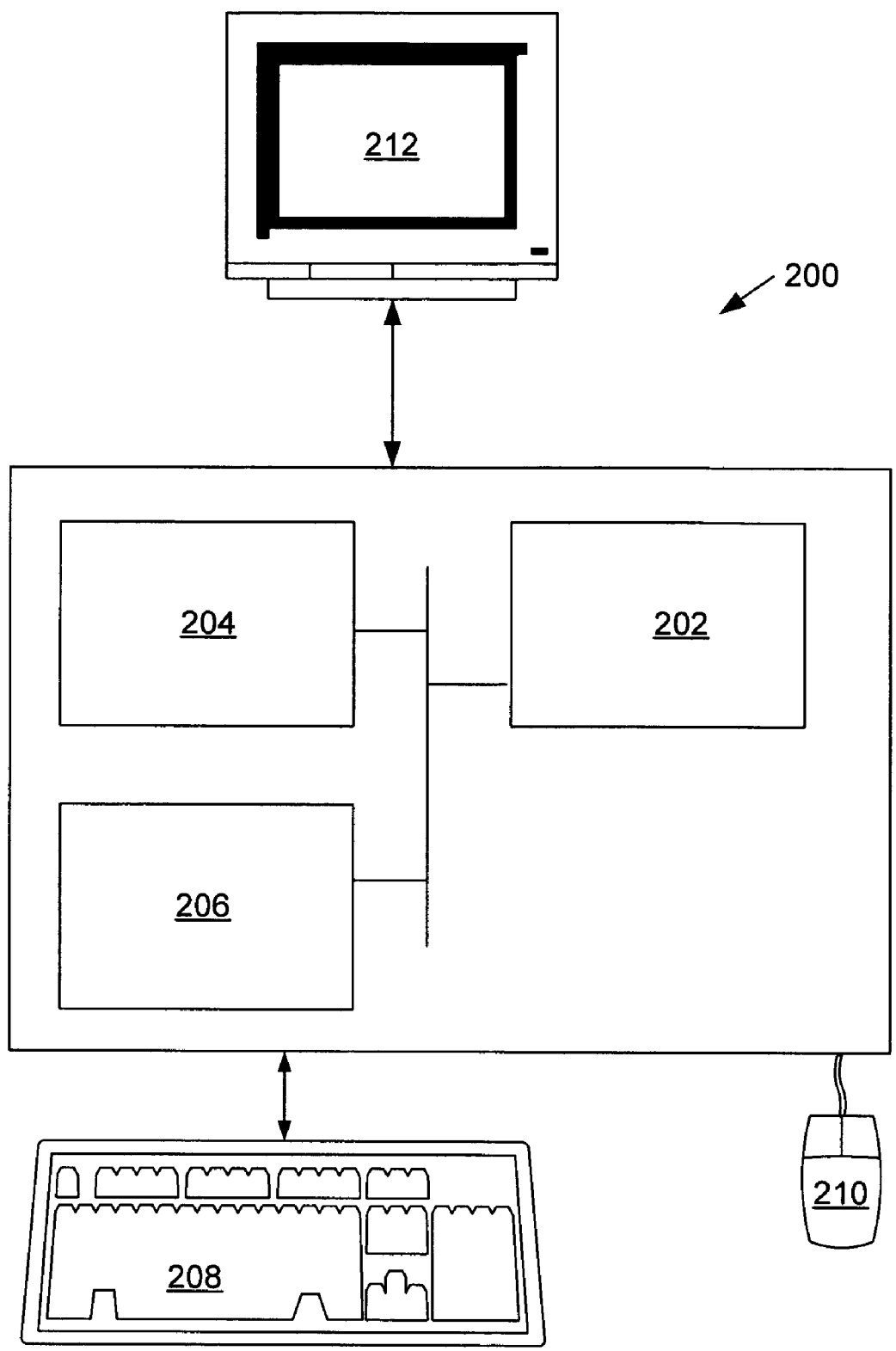
FIG. 3 shows a computer system in accordance with one embodiment of the invention.

The invention may be implemented on virtually any type of computer regardless of the platform being used. For example, as shown in FIG. 3, a computer system (200) includes a processor (202), associated memory (204), a storage device (206), and numerous other elements and functionalities typical of today's computers (not shown). The computer (200) may also include input means, such as a keyboard (208) and a mouse (210), and output means, such as a monitor (212). The computer system (200) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (200) may be located at a remote location and connected to the other elements over a network. Further, the invention may be implemented on a distributed system having a plurality of nodes, where each portion of the invention (e.g., the client, the link aggregation module, the aggregation group, etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for configuring a link aggregation module, comprising:
    configuring the link aggregation module to use an initial network interface card (NIC) selection algorithm, wherein the link aggregation module is within a kernel executing on a computer;
    receiving, from the kernel, a first plurality of packets;
    servicing the first plurality of packets using a plurality of NICs in an aggregation group, wherein the aggregation group is operatively connected to the computer, wherein the initial NIC selection algorithm is used by the link aggregation module to select the one of the plurality of NICs to service at least one of the first plurality of packets, and wherein the at least one of the first plurality of packets is transmitted on a network after being serviced by the one of the plurality of NICs;
    collecting a plurality of first packet distribution statistics for the aggregation group corresponding to the servicing of the first plurality of packets; and
    selecting, by the link aggregation module, a first alternate NIC selection algorithm based on the plurality of first packet distribution statistics,
    wherein the plurality of first packet distribution statistics comprises at least one selected from a group consisting of a number of the first plurality of packets serviced by each of the plurality of NICs and overall rate of servicing the first plurality of packets.

2. The method of claim 1, further comprising:
    determining whether the initial NIC selection algorithm is distributing the servicing of the first plurality of packets across the plurality of NICs at a minimum threshold level based on the first plurality of packet distribution statistics,
    wherein the first alternate NIC selection algorithm is selected if the initial NIC selection algorithm is distributing the servicing of the first plurality of packets below the minimum threshold level.

3. The method of claim 2, further comprising:
    servicing a second plurality of packets using the plurality of NICs in the aggregation group, wherein the first alternate NIC selection algorithm is used to select the one of the plurality of NICs to service at least one of the second plurality of packets;
    collecting a plurality of second packet distribution statistics for the aggregation group corresponding to the servicing of the second plurality of packets;
    determining whether the first alternate NIC selection algorithm is distributing the serving of the second plurality of packets across the plurality of NICs at the minimum threshold level using the plurality of second packet distribution statistics; and
    selecting a second alternate NIC selection algorithm if the first alternate NIC selection algorithm is distributing the servicing of the second plurality of packets below the minimum threshold level.

4. The method of claim 1, wherein the initial NIC selection algorithm uses a media access control address to select the one of the plurality of NICs to service the at least one of the first plurality of packets.

5. The method of claim 1, wherein the initial NIC selection algorithm uses protocol information to select the one of the plurality of NICs to service the at least one of the first plurality of packets.

6. The method of claim 5, wherein the protocol information is at least one selected from the group consisting of a source port, a destination port, a source Internet Protocol (IP) address, and a destination IP address.

7. The method of claim 1, wherein the initial NIC selection algorithm is selected using at least one method from the group consisting of default selection, random selection, and user selection.

8. A system, comprising:
    a client configured to send a plurality of packets;
    an aggregation group comprising a plurality of network interface cards (NICs); and
    a link aggregation module within a kernel executing on a computer operatively connected to the aggregation group, initially configured to:
        receive, from the kernel, the plurality of packets;
        servicing, by the aggregation group, the plurality of packets using an initial NIC selection algorithm, wherein the initial NIC selection algorithm is used by the link aggregation module to select the one of the plurality of NICs to service at least one of the plurality of packets, and wherein the at least one of the plurality of packets is transmitted on a network after being serviced by the one of the plurality of NICs;
        collect a plurality of packet distribution statistics for the aggregation group corresponding to the servicing of the plurality of packets; and select, by the link aggregation module, a first alternate NIC selection algorithm based on the plurality of packet distribution statistics, wherein the plurality packet distribution statistics comprises at least one selected from a group consisting of a number of plurality of packets serviced by each of the plurality of NICs and overall rate of servicing the plurality of packets.

9. The system of claim 8, wherein the link aggregation module is configured to determine whether the initial NIC selection algorithm is distributing the servicing of the plurality of packets across the plurality of NICs at a minimum threshold level based on the plurality of packet distribution statistics, wherein the first alternate NIC selection algorithm is selected if the initial NIC selection algorithm is distributing the servicing of the plurality of packets below the minimum threshold level.

10. The system of claim 8, wherein the initial NIC selection algorithm uses a media access control address of the at least one of the plurality of packets to select the one of the plurality of NICs to service the at least one of the plurality of packets.

11. The system of claim 8, wherein the initial NIC selection algorithm uses protocol information to select the one of the plurality of NICs to service the at least one of the plurality of packets.

12. The system of claim 11, wherein the protocol information is at least one selected from the group consisting of a source port, a destination port, a source Internet Protocol (IP) address, and a destination IP address.

13. The system of claim 8, wherein the initial NIC selection algorithm is selected using at least one method from the group consisting of default selection, random selection, and user selection.

14. A computer system for configuring a link aggregation module, comprising:
a processor;
a memory;
a storage device; and
software instructions stored in the memory for enabling the computer system under control of the processor, to:
configure the link aggregation module to use an initial network interface card (NIC) selection algorithm, wherein the link aggregation module is within a kernel executing on the computer system;
receive, from the kernel, a plurality of packets;
service the plurality of packets using a plurality of NICs in an aggregation group, wherein the aggregation group is operatively connected to the computer system, wherein the initial NIC selection algorithm is used by the link aggregation module to select the one of the plurality of NICs to service at least one of the plurality of packets, and wherein the at least one of the first plurality of packets is transmitted on a network after being serviced by the one of the plurality of NICs;
collect a plurality of packet distribution statistics for the aggregation group corresponding to the servicing of the plurality of packets; and
select, by the link aggregation module, a first alternate NIC selection algorithm based on the plurality of packet distribution statistics,
wherein the plurality of packet distribution statistics comprises at least one selected from a group consisting of a number of the plurality of packets serviced by each of the plurality of NICs and overall rate of servicing the plurality of packets.

15. The computer system of claim 14, further comprising software instructions to:
determine whether the initial NIC selection algorithm is distributing the servicing of the plurality of packets across the plurality of NICs at a minimum threshold level based on the plurality of packet distribution statistics,
wherein the first alternate NIC selection algorithm is selected if the initial NIC selection algorithm is distributing the servicing of the plurality of packets below the minimum threshold level.

16. The computer system of claim 14, wherein the initial NIC selection algorithm uses a media access control address to select the one of the plurality of NICs to service the at least one of the plurality of packets.

17. The computer system of claim 14, wherein the initial NIC selection algorithm uses protocol information to select the one of the plurality of NICs to service the at least one of the plurality of packets.

18. The computer system of claim 17, wherein the protocol information is at least one selected from the group consisting of a source port, a destination port, a source Internet Protocol (IP) address and a destination IP address.

19. The computer system of claim 14, wherein the initial NIC selection algorithm is selected using at least one method from the group consisting of default selection, random selection, and user selection.

20. A non-transitory computer readable medium for configuring a link aggregation module, comprising software instructions to:
configure the link aggregation module to use an initial network interface card (NIC) selection algorithm, wherein the link aggregation module is within a kernel executing on a computer;
receive, from the kernel, a plurality of packets;
service the a plurality of packets using a plurality of NICs in an aggregation group, wherein the aggregation group is operatively connected to the computer, wherein the initial NIC selection algorithm is used by the link aggregation module to select the one of the plurality of NICs to service at least one of the plurality of packets, and wherein the at least one of the first plurality of packets is transmitted on a network after being serviced by the one of the plurality of NICs;
collect a plurality of packet distribution statistics for the aggregation group corresponding to the servicing of the plurality of packets; and
select, by the link aggregation module, a first alternate NIC selection algorithm based on the plurality of packet distribution statistics,
wherein the plurality of packet distribution statistics comprises at least one selected from a group consisting of utilization of system resources, utilization of network infrastructure resources, a number of the plurality of packets serviced by each of the plurality of NICs, and overall rate of servicing the plurality of packets.

21. A plurality of nodes, comprising:
a client, executing on at least one processor of at least one of the plurality of nodes, configured to send a plurality of packets;
an aggregation group comprising a plurality of network interface cards (NICs); and
a link aggregation module within a kernel, executing on at least one processor of at least one of the plurality of nodes, initially configured to:
receiving, from the kernel, the plurality of packets;

service, by the aggregation group, the plurality of packets using an initial NIC selection algorithm, wherein the initial NIC selection algorithm is used by the link aggregation module to select the one of the plurality of NICs to service at least one of the plurality of packets, and wherein the at least one of the plurality of packets is transmitted on a network after being serviced by the one of the plurality of NICs;

collect a plurality of packet distribution statistics for the aggregation group corresponding to the servicing of the plurality of packets; and select, by the link aggregation module, a first alternate NIC selection algorithm based on the plurality of packet distribution statistics, wherein the plurality of packet distribution statistics comprises at least one selected from a group consisting of utilization of system resources, utilization of network infrastructure resources, a number of the plurality of packets serviced by each of the plurality of NICs, and overall rate of servicing the plurality of packets, wherein the client is located on at least one of the plurality of nodes, wherein the aggregation group is operatively connected to at least one of the plurality of nodes, wherein the link aggregation module is located on at least one of the plurality of nodes.

* * * * *